(No Model.)
W. E. KARNS.
VEHICLE.
No. 544,672.
Patented Aug. 20, 1895.
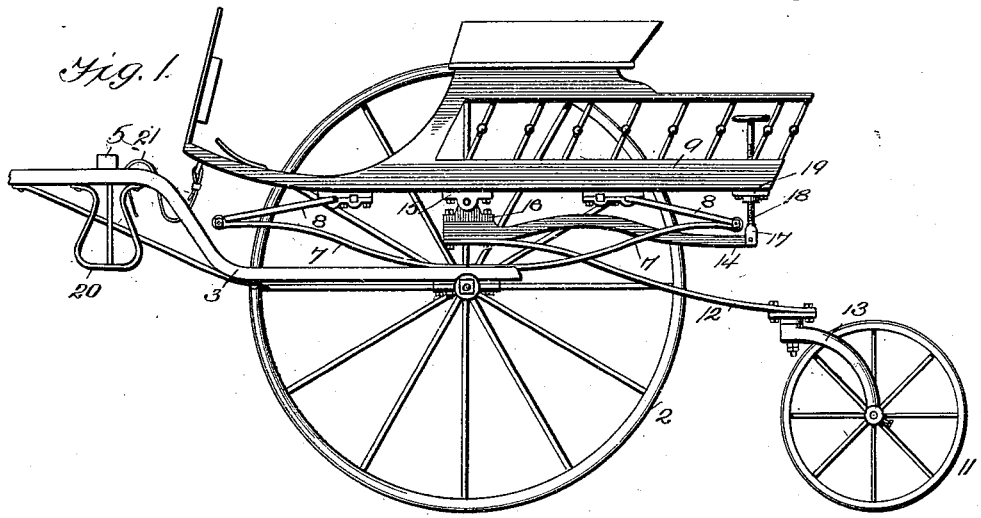
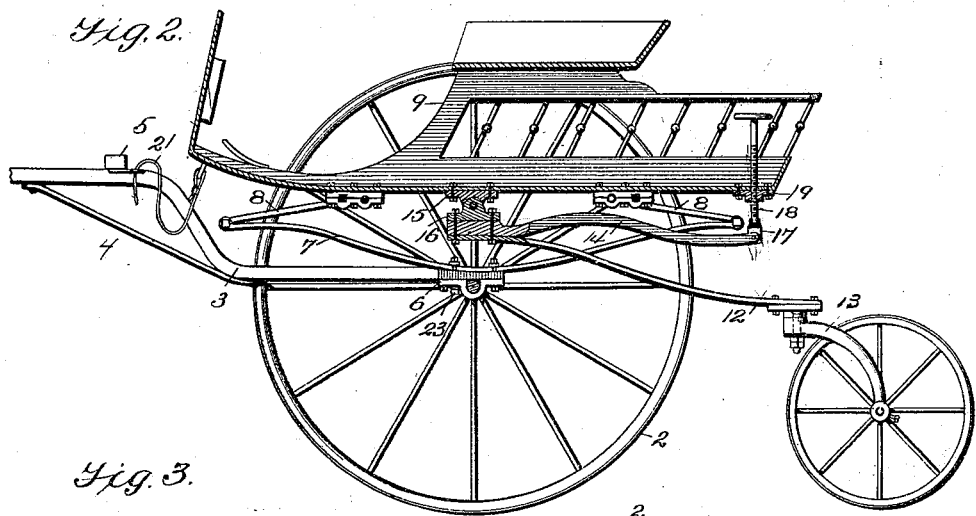
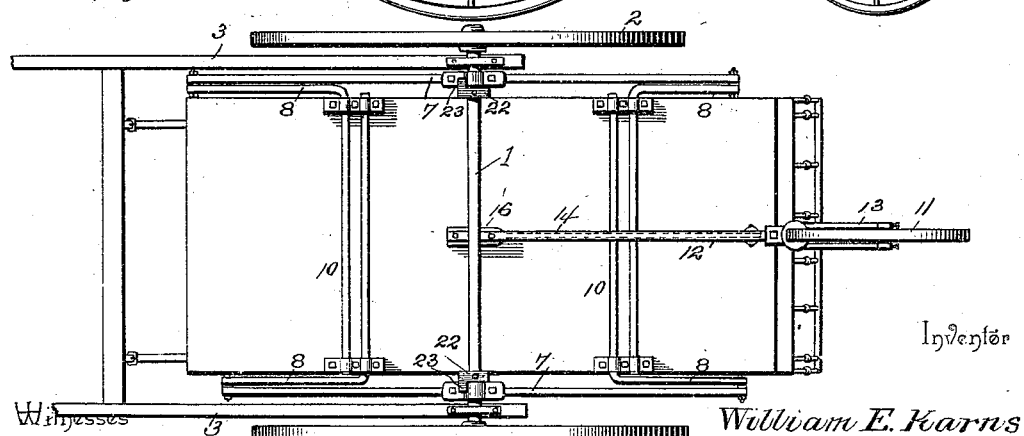
Witnesses
Jos. C. Stack
N. J. Riley
Inventor
William E. Karns
By C. A. Snow & Co.
Attorneys.

United States Patent Office.

WILLIAM E. KARNS, OF PARKER'S LANDING, PENNSYLVANIA.

VEHICLE.

SPECIFICATION forming part of Letters Patent No. 544,672, dated August 20, 1895.

Application filed January 19, 1895. Serial No. 535,541. (No model.)

*To all whom it may concern:*

Be it known that I, WILLIAM E. KARNS, a citizen of the United States, residing at Parker's Landing, in the county of Armstrong and State of Pennsylvania, have invented a new and useful Vehicle, of which the following is a specification.

The invention relates to improvements in two-wheeled vehicles.

The object of the present invention is to improve the construction of two-wheeled vehicles and to prevent the horse motion incident to the ordinary construction of such vehicles from being communicated to the occupants.

A further object of the invention is to enable the body to be readily adjusted to suit the weight of its contents and to maintain it properly in a horizontal position whether ascending or descending hills or traveling over level ground.

The invention consists in the construction and novel combination and arrangement of parts hereinafter fully described, illustrated in the accompanying drawings, and pointed out in the claims hereto appended.

In the drawings, Figure 1 is a side elevation of a vehicle constructed in accordance with this invention. Fig. 2 is a central longitudinal sectional view of the same. Fig. 3 is a reverse plan view.

Like numerals of reference indicate corresponding parts in all the figures of the drawings.

1 designates an axle, having journaled on its spindles wheels 2 and having clipped to it, adjacent to the wheels, a pair of shafts 3, having upwardly-offset front portions and supported by braces 4 and connected by an ordinary cross-bar 5. The axle has journaled on it bearings 6, to which are clipped body-supporting springs 7, of elliptical form and consisting of continuous lower portions and short inward-extending arms or upper portions 8, secured to a body 9 by means of suitable boxes or bearings and transverse extensions 10.

The body and the springs may be of any desired construction, and the connections between the springs and the shafts or axle permit the shafts to move vertically, incident to the horse motion, without the latter affecting the body of the vehicle or the occupants thereof.

In order to support the body 9 in a horizontal position, or at any other desired adjustment, a caster-wheel 11 is employed, and is connected by a curved spring 12 with the body 9 at a point directly above or to one side of the axle. The swivel or caster-wheel 11 is provided with a standard 13, which is forked, and which has its upper end pivoted or swiveled to the rear end of the spring 12, and is adapted to permit the vehicle to be turned with the same facility as the ordinary two-wheeled vehicle.

The upper end of the spring 12 is connected by suitable fastening devices with the front end of a rearwardly-extending adjustable lever 14, which has its front end hingedly or pivotally connected with and fulcrumed on the lower face of the bottom of the body, and its rear end is adjustably connected with the body at the back thereof. The front end of the lever is fulcrumed by means of upper and lower plates 15 and 16, provided with perforated lugs or ears connected by a transverse bolt or pivot.

The rear end of the adjustable lever is connected by a coupling 17 with the lower end of a vertically-disposed screw 18, extending through the bottom of the body and engaging a suitable threaded opening or nut 19 and terminating at its upper end in a suitable handle or hand-wheel. The coupling 17 is swiveled to the screw and pivotally connected to the lever, and the hand-wheel or handle is arranged within convenient reach of the seat, and the occupants may readily adjust the body and raise or lower the rear end thereof, the body turning on the fulcrum or pivot of the lever. By this construction the body may be readily adjusted to suit the weight of its occupants or contents and to make it assume a perfectly horizontal position whether traveling up or down hill or on level ground.

Suitable steps 20 are provided, and a stay-strap 21 is also used, and in order to prevent the front portion of the body being depressed to too great an extent when a person is getting into or leaving the vehicle plates 22 are provided and are secured to the lower face of the axle and have lateral projections 23, arranged below the bearings 6 and adapted to support the front portions of the bearings to limit the downward movement of the front of the body; but sufficient space is left between these lateral projections to prevent the boxes or bearings from coming in contact with them through horse motion, and when the occupant is properly seated within the body.

Should the rear wheel 11 come in contact with an obstruction, the curved spring 12 will permit it to yield sufficiently to avoid indicating any shock or jars to the occupant.

It will be seen that the improvement is simple and effective, that it permits free movement of the shafts or thills and prevents any horse motion from being communicated to the body, and that the latter is adjustably supported and prevented from tilting too far in either a forward or a rearward direction. It will also be apparent that the body may be maintained always in a horizontal position, whether traveling over a level surface or ascending or descending a hill, and that the body may also be adjusted to suit the weight of the occupants or other contents.

Changes in the form, proportion, and the minor details of construction may be resorted to without departing from the principle or sacrificing any of the advantages of this invention.

What I claim is—

1. The combination of an axle, shafts secured thereto, a body, springs journaled on the axle and supporting the body, a spring pivotally connected at its front end with the body and extending rearward, a wheel connected with the rear end of the rearwardly extending spring, and means for adjustably connecting the body with the rearwardly extending spring, substantially as described.

2. The combination of an axle, shafts secured thereto, a body, springs journaled on the axle and supporting the body, a lever fulcrumed on the bottom of the body, a spring secured to the lever and extending rearward, a wheel connected with the rearwardly extending spring, and means for adjustably connecting the lever with the body, substantially as described.

3. The combination of an axle, shafts secured to the same, a body, springs journaled on the axle and supporting the body, a lever fulcrumed at one end on the body, a spring extending rearward from the fulcrumed end of the lever, a swiveled wheel connected with the rearwardly extending spring, and an adjusting screw mounted on the body and connected with the other end of said lever, substantially as described.

4. The combination of an axle, shafts secured to the same, a body, springs journaled on the axle and supporting the body, a lever fulcrumed on the body and disposed longitudinally thereof, the spring 12 extending rearward from the lever, a caster wheel supporting the rear end of the spring 12, stops mounted on the axle and limiting the forward swing of the body, and means for adjustably connecting the lever with the body, substantially as described.

5. The combination of an axle, shafts secured thereto, a body, springs on the axle supporting the body, a spring pivotally connected at its front end with the body and extending rearward, and a wheel connected with the rear end of the rearwardly extending spring, substantially as described.

In testimony that I claim the foregoing as my own I have hereto affixed my signature in the presence of two witnesses.

WILLIAM E. KARNS.

Witnesses:
J. H. SIGGERS,
E. G. SIGGERS.